(12) United States Patent
Contractor

(10) Patent No.: US 6,711,240 B2
(45) Date of Patent: Mar. 23, 2004

(54) SYSTEMS AND METHODS FOR PER USE MESSAGE DELIVERY

(75) Inventor: Sunil Contractor, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 197 days.

(21) Appl. No.: 09/727,660

(22) Filed: Dec. 1, 2000

(65) Prior Publication Data

US 2002/0136366 A1 Sep. 26, 2002

(51) Int. Cl.[7] .......................... H04M 1/64; H04M 3/42; H04M 7/00
(52) U.S. Cl. ............. 379/88.12; 379/67.1; 379/88.17; 379/88.18; 379/88.22; 379/88.26; 379/201.01; 379/209.01; 379/211.02; 379/219; 379/221.08
(58) Field of Search .................. 379/67.1, 88.09, 379/88.12, 88.13, 88.17, 88.18, 88.21, 88.22, 88.25, 88.26, 201.01, 209.01, 210.01, 211.02, 212.01, 219, 220.01, 221.08

(56) References Cited

U.S. PATENT DOCUMENTS

| | | | | |
|---|---|---|---|---|
| 4,625,081 A | * | 11/1986 | Lotito et al. ............... 379/88 |
| 4,757,525 A | * | 7/1988 | Matthews et al. ............ 379/88 |
| 4,972,461 A | * | 11/1990 | Brown et al. ................ 379/67 |
| 5,185,782 A | | 2/1993 | Srinivasan ................ 379/67.1 |
| 5,311,589 A | | 5/1994 | Bennett et al. ............ 379/386 |
| 5,396,542 A | | 3/1995 | Alger et al. .............. 379/67.1 |
| 5,425,091 A | | 6/1995 | Josephs ..................... 379/201 |
| 5,471,519 A | | 11/1995 | Howe et al. ................. 379/67 |
| 5,475,737 A | | 12/1995 | Garner et al. ............... 379/67 |
| 5,583,920 A | | 12/1996 | Wheeler, Jr. ................ 379/88 |
| 5,610,969 A | | 3/1997 | McHenry et al. ............. 379/56 |
| 5,701,301 A | | 12/1997 | Weisser, Jr. ............... 370/428 |
| 5,742,905 A | * | 4/1998 | Pepe et al. ................. 455/461 |
| 5,778,052 A | | 7/1998 | Rubin et al. ............ 379/207.03 |
| 5,790,639 A | | 8/1998 | Ranalli et al. ......... 379/100.08 |
| 5,797,124 A | | 8/1998 | Walsh et al. ............... 704/275 |
| 5,812,639 A | | 9/1998 | Bartholomew et al. ........ 379/89 |
| 5,953,657 A | | 9/1999 | Ghisler ..................... 455/417 |
| 5,956,390 A | | 9/1999 | McKibben et al. ........ 379/93.07 |
| 5,963,864 A | | 10/1999 | O'Neil ..................... 455/445 |
| 5,995,848 A | | 11/1999 | Nguyen .................... 455/528 |
| 6,014,377 A | | 1/2000 | Gillespie .................. 370/351 |
| 6,055,302 A | | 4/2000 | Schmersel et al. .......... 379/207 |
| 6,064,874 A | | 5/2000 | Cox et al. .................. 455/404 |
| 6,160,878 A | | 12/2000 | Hau et al. .................. 379/201 |
| 6,215,858 B1 | * | 4/2001 | Bartholomew et al. .. 379/88.17 |
| 6,240,174 B1 | | 5/2001 | Silver ....................... 379/230 |
| 6,285,745 B1 | * | 9/2001 | Bartholomew et al. .. 379/88.17 |
| 6,317,594 B1 | * | 11/2001 | Gossman et al. ............ 455/414 |
| 6,397,055 B1 | | 5/2002 | McHenry et al. ........... 455/408 |
| 6,411,704 B1 | | 6/2002 | Pelletier et al. ............ 379/230 |
| 6,418,306 B1 | | 7/2002 | McConnell ................ 455/413 |
| 6,442,250 B1 | | 8/2002 | Troen-Krasnow et al. ................ 379/93.15 |
| 6,463,136 B1 | | 10/2002 | Malik ....................... 379/111 |

FOREIGN PATENT DOCUMENTS

| | | |
|---|---|---|
| DE | 198 14 450 A1 | 10/1999 |
| EP | 0 905 959 A2 | 3/1999 |
| WO | WO 97 33421 A | 9/1997 |
| WO | WO 98/27712 | 6/1998 |
| WO | WO 98/43402 | 10/1998 |
| WO | WO 98/45383 | 10/1998 |
| WO | WO 00 70647 A | 11/2000 |

OTHER PUBLICATIONS

Neuer, E.I., "Personal Communication in Traditional Cellular Networks", *Proceedings of the SPIE*, SPIE, Billingham, VA, 1996, 2602, 184–194.

* cited by examiner

*Primary Examiner*—Allan Hoosain
(74) *Attorney, Agent, or Firm*—Woodcock Washburn LLP

(57) ABSTRACT

A calling party dials a called party, leaves a message on a voice messaging system after either receiving a busy status or a no-answer status, and the messaging system dials the called party at intervals until receiving an answer status and then plays the message. Prompts for delivery options and message options may be included.

20 Claims, 4 Drawing Sheets

SYSTEMS AND METHODS FOR PER USE MESSAGE DELIVERY

FIELD OF THE INVENTION

The present invention generally relates to the field of telecommunications and to systems and methods for managing telephony-based services. More particularly, the present invention relates to a voice messaging system that calls a called party to play a previously stored message.

BACKGROUND OF THE INVENTION

Today, due to busy life and work environment, it is often difficult to reach a person on their telephone and many people still do not have answering machines or subscribe to voice messaging systems. Many people have several telephone numbers, including a wireless phone, an office phone, and a home phone. While there are enhanced features available for a called party to forward calls between phones, many people do not regularly forward their telephone calls. Also, many times a wireless phone is unavailable for various reasons. For example, many people only turn on their wireless telephone when they are away from their wire line phone. Also, wireless telephones, because of their battery limitations and other factors including convenience, are turned on and off by the wireless user. Furthermore, a wireless user may be unavailable because the wireless telephone is outside of the service range of their wireless telephone provider. Therefore, people are often unavailable by phone and if a called party does not have an answering machine or does not subscribe to a voice messaging service, it becomes difficult to leave a message.

Also, answering machines may fail and be unavailable to store messages. Further, most answering machines are not capable of receiving a call and recording a message if the telephone line is already in use. Additionally, there are many times when it may take many telephone calls to several different numbers to find the called party, when it would be desirable to just leave a message.

In view of the foregoing, there is a need for systems and methods that overcome the limitations and drawbacks of conventional systems by allowing a calling party to leave a message for a called party, in the aforementioned circumstances.

SUMMARY OF THE PRESENT INVENTION

The present invention is directed to systems and methods for a calling party to leave a message on a voice messaging system, and the messaging system to dial the called party to play the message at a later time. Preferably, the invention is implemented on an Advanced Intelligent Network (AIN) version of a wire line telephone system.

According to aspects of the invention, a subscriber (i.e., the calling party) is prompted for, and an associated system subsequently receives, message options including reviewing the message, deleting the message, re-recording the message, and/or sending the message. Preferably, the prompt is audible voice notification. Preferably, the system receives message options through either telephone keypad entry or through voice recognition and processing techniques.

According to further aspects of the invention, a subscriber is prompted for, and the system receives, delivery options including a frequency of how often to dial the called party, a maximum time or number of tries to dial the called party, a specific time to dial the called party, a time to begin regular calls to the called party, and/or a telephone number to call the called party. Alternatively, the system may prompt the user for a priority level (e.g., high priority, low priority) and the system may accordingly determine how often and how long to dial the called party.

According to other aspects of the invention, a subscriber list is provided including a list of subscribers.

The above-listed features of the present invention will be more fully set forth hereinafter.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

The present invention is directed to a calling party, that is a subscriber, leaving a message on a voice messaging system, and the messaging system dialing the called party to play the message at a later time. Preferably, the system prompts for and receives message options. The present invention may be implemented on an Advanced Intelligent Network (AIN) based wire line telephone system.

AIN Overview

An AIN is a particular type of telephone system with intelligent devices that handle the messaging and routing of calls. In addition, these intelligent devices may also provide enhanced features. These intelligent devices were first developed and implemented in late 1970's and early 1980's to address the inefficiencies of the then existing telephone system.

In a wire line telephone system without AIN capabilities, central offices (CO), described below, are interconnected by trunk lines. Trunk lines provide for communication, such as voice or data, for example, telephone calls between telephone users or data between fax machines. However, the COs also use the trunk lines to signal each other for messaging and routing information, as well as for communication. The COs use multifrequency signaling that occupies bandwidth on the trunk lines, which could otherwise be used for communication. The term "communication" or "call" is used herein to include messages that may be exchanged between a calling party and a called party over a telephone system.

In a wire line telephone system with AIN capabilities, intelligent devices are included in the telephone system to perform messaging and routing without using the trunk lines, thereby allowing more communication over the trunk lines. Additionally, because these intelligent devices are programmable, they provide the ability for enhanced features. These intelligent devices are interconnected to the COs and are described more fully in U.S. Pat. No. 5,701,301, which is incorporated herein by reference in its entirety. In an AIN wire line telephone system, COs are replaced with service switching point (SSP) central offices, which are central offices that include intelligent network functionality, for allowing the central offices to communicate with the intelligent devices. Preferably, an AIN system with at least AIN Release 0.2 and advanced intelligent network capabilities may be utilized to implement the various features and aspects of the invention.

Figure 1:
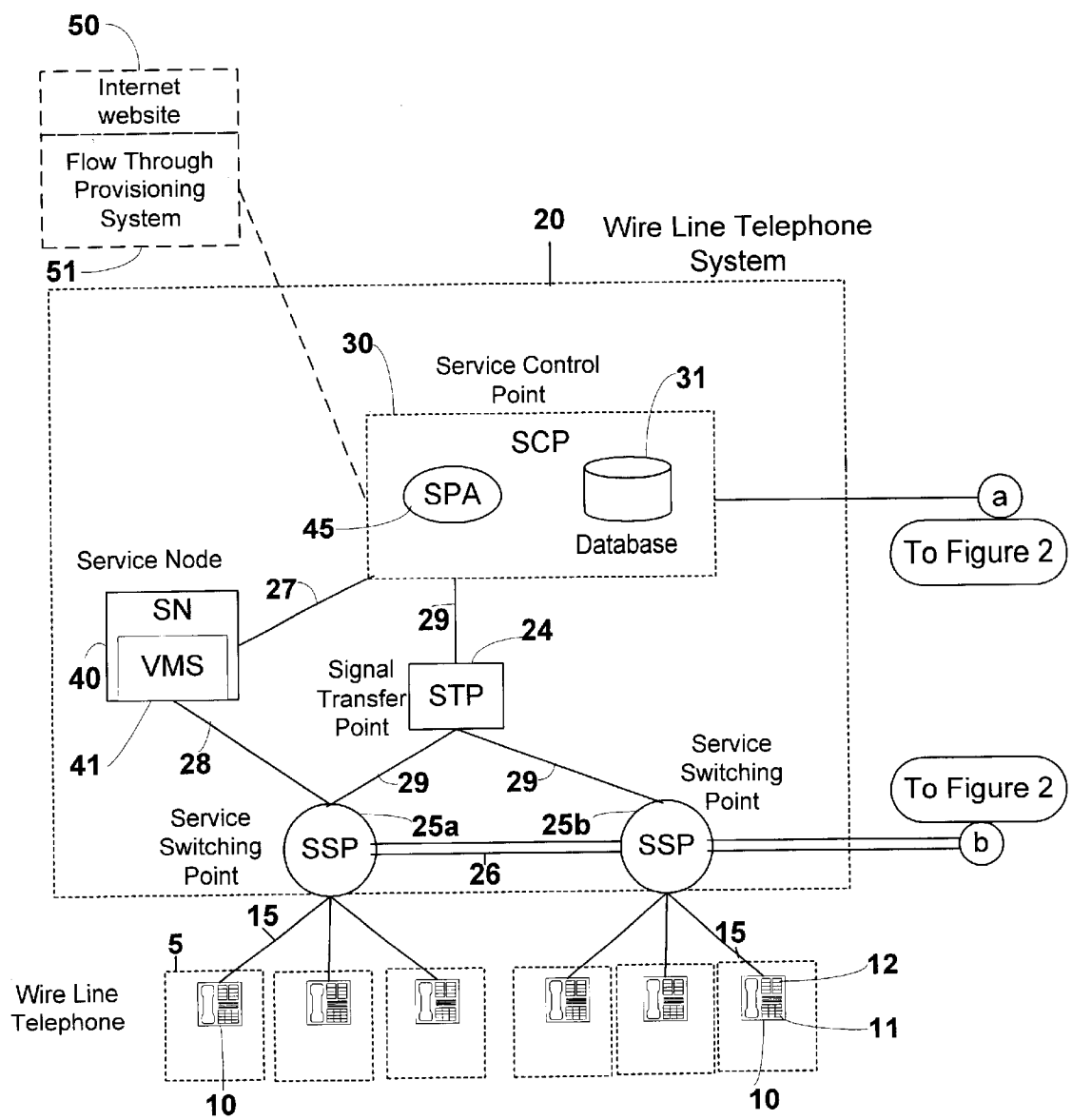
FIG. 1 is a general block diagram of an exemplary Advanced Intelligent Network (AIN) based wire line system for implementing intelligent network management features, in accordance with the present invention.

FIG. 1 is a general block diagram of an exemplary AIN based wire line system for implementing intelligent network management features in accordance with the present invention. As shown in FIG. 1, an AIN wire line telephone system 20 includes at least one service control point (SCP) 30, at least one signal transfer point (STP) 24, at least one service switching point central office (SSP), shown as 25a, 25b (commonly referred to hereinafter as 25), and a plurality of subscriber locations 5. Optionally, the wire line telephone system 20 may include at least one service node (SN) 40.

Subscriber locations 5 include terminating equipment, which may be a wire line telephone 10. Although wire line telephones 10 are illustrated as the pieces of terminating equipment in FIG. 1, those skilled in the art will understand that such pieces include other telecommunication devices such as facsimile machines, computers, modems, etc. Wire line telephones 10 may include a telephone keypad 11 and indicating lamps 12.

Subscriber locations 5 are connected to an SSP 25 via telephone lines 15 (e.g., plain old telephone service (POTS), or similar). A telephone line 15 may also be referred to as a calling line and the terms will be used interchangeably hereinafter. Each SSP 25 serves a designated group of calling lines, and thus, the SSP 25 that serves a particular calling line may be referred to as its serving switch or local SSP 25. Alternatively, subscriber locations 5 may be connected to a private branch exchange (not shown), before connecting to an SSP 25.

Each active calling line in an AIN is assigned a ten digit calling line number. The term "calling line number" is used in its generally understood meaning to be the number which is dialed or input into the telephone keypad 11 by a calling party or source to reach a piece of terminating equipment on a calling line associated with the dialed calling line number. A calling line number is commonly referred to as a telephone number or a directory number and these terms will be used interchangeably herein. A calling line number associated with wire line telephone system 20 is referred to herein as a wire line number. A calling line number associated with a wireless telephone system (for example, wireless telephone system 100 described below with respect to FIG. 2) is referred to herein as a wireless number.

A party making a telephone call is referred to as the calling party and the party intended to be reached is referred to as the called party. The calling line number of the calling party is the calling number. The calling line number of the called party is the called number. In a typical application, when a calling party dials a called number, the SSP 25 of the calling number (e.g., the calling or originating SSP 25a), connects to the SSP 25 (e.g., the called or terminating SSP 25b) of the called number, over trunk lines 26. The SSP 25 of the calling number rings the wire line telephone 10 of the called number.

A telephone call may result in several statuses. A busy status occurs when the called party's line is busy. For example, the called party may currently be using the telephone. A no-answer status occurs when there is no answer on the called party's line after a predetermined time. For example, the called party may not be near the telephone 10 to answer. Alternatively, if the called party has forwarded their calls to a second telephone, a no-answer status will occur if there is no answer on the second telephone. Also, in a wireless telephone system 100 the called party may not answer the telephone 110 or the telephone 110 may be turned off. An answer status occurs when the calling party answers the telephone, for example, by taking the telephone 10 off-hook in response to receiving a telephone call. The predetermined time is a programmable time. Ideally the time is programmed to trigger a no-answer status before an answering machine or a voice messaging system answers the call. If however, an answering machine or voice messaging system answers a call, an answer status will be triggered.

The SSPs 25 are each programmable switches which recognize AIN-type calls, launch queries to intelligent devices in the AIN, receive commands and data from the intelligent devices within the AIN to further process and route calls, and can be configured with triggers (more fully described below) to initiate AIN actions.

SSPs 25 are also connected to another type of AIN element referred to as an STP 24 via respective data links 29. Currently, these data links 29 employ a signaling protocol referred to as Signaling System 7 (SS7), which is well known to those skilled in the art and described in a specification promulgated by the American National Standards Institute (ANSI). The SS7 protocol is a layered protocol, which employs data packets, synonymously referred to as packets, information packets, message packets, or messages. A data packet includes a beginning header, an ending header, and error checking bits.

STPs 24 perform messaging and routing functions between the SSPs 25 and the SCP 30 on an AIN network. Each SSP 25 is directly connected to an STP 24, which is its local STP 24. Each STP 24 may be connected to several SSPs 25. If an SSP 25 sends a message to another intelligent device on the AIN, the SSP 25 will first send the message to its local STP 24. STP 24 will read the message and determine where to route the message. Typically, the STP 24 will send the message to the SCP 30. The SCP 30 will then process the message and send a reply message to the appropriate STP 24. The STP 24 will then read the reply message and send that reply message to the appropriate SSP 25.

Much of the intelligence of the AIN resides in SCP 30, which includes a database 31, and is connected to STP 24 over data link 29. Typically, the SCP 30 is also the repository of service package applications (SPA) 45 that are used in connection with or as part of the database 31 in the application of telecommunication services or enhanced features to calling lines. SPAs 45 reside on SCP 30 and provide the programmable device with intelligence to process calls and queries sent from SSPs 25 and other AIN devices. An SCP 30 receives messages from devices within the wire line telephone network 20, processes the messages according to an SPA 45, and returns a reply message to the appropriate device in the network 20. The messages may include routing requests and/or enhanced features. An example of an enhanced feature available from a SPA 45 is caller identification. In caller identification, the called party receives the identification (e.g., the calling number) of the calling party along with the call. A telephone user may subscribe to an enhanced feature available in the AIN. A telephone user subscribing to an embodiment of the present invention is referred to as a subscriber.

The AIN may also include an SN 40, which is an interactive data system that may act as a switch to transfer calls, recognize telephone keypad inputs and voice commands, provide voice synthesis, and/or store messages. SN 40 includes both voice and dual tone multi-frequency (DTMF) signal recognition devices and voice synthesis devices and therefore can respond to both voice commands and telephone keypad 11 commands. In addition, SN 40 may include a data assembly interface and a data storage device. The data storage device may be used to store audio messages. The SN 40 may provide interactive help, collect voice information from subscribers in a call, track calls, and provide indication, announcement, and messaging functions.

Voice messaging system 41 is preferably included in SN 40, although it may be located elsewhere, such as within the SCP 30 or as a standalone system. Voice messaging system 41 may receive and store messages. Voice messaging system 41 may provide prompts, which are preferably, voice synthesized. Voice messaging system 41 may recognize telephone keypad inputs and voice commands, dial telephone numbers, and deliver messages.

SN 40 is connected to the SCP 30 over data link 27. This connection is typically accomplished with an X.25 protocol or TCP/IP protocol. In addition, SN 40 typically is connected to one or more SSPs 25 via Integrated Service Digital Network (ISDN) data links as shown by the data link 28 between SSP 25a and SN 40.

In order to keep the processing of data and calls as simple as possible, a relatively small set of triggers may be defined for each SSP 25. Specific triggers may also be defined for each calling line number. A trigger is an event that generates a message to be sent to a device within the AIN. For example, the trigger may cause the SSP 25 to send a query message to the SCP 30 requesting instructions to process the call. SCP 30 may then query its database 31 for processing instructions with respect to a particular call. The results of the database inquiry are sent back to the SSP 25 in a response from the SCP 30 through STP 24. The return message may include call processing instructions to the SSP 25. The instructions may command the SSP 25 to take some special action as a result of a customized calling service or enhanced feature, for example, forwarding a call to a voice messaging system. In response, the SSP 25 may move through its call states, collect telephone keypad inputs, generate further messages, or route calls to complete the command issued by the SCP 30.

Various triggers can by configured for each calling line number or for each SSP 25. Triggers may be configured to affect either the calling party or the called party, or both. For example, an Off-hook Trigger may be set on the calling number. If this trigger is set, the SSP 25 initiates a query to the SCP 30 every time that calling number line is taken off-hook. The SCP 30 then processes the information to determine how the call should be processed and replies to SSP 25 with instructions on how the call should be processed. Alternatively, a trigger may be set on the called line number which will trigger an AIN message to be sent. One skilled in the art of AIN applications will understand the various triggers available in a particular AIN system.

An Internet website 50 or other remote data store or network may be connected to the wire line telephone system 20 via a flow through provisioning system 51. The Internet is a vast network of interconnected computers communicating over a collection of networks, including Arpanet, NSFnet, regional networks such as NYsernet, local networks at a number of university and research institutions, and a number of military networks. The protocols generally referred to as TCP/IP were originally developed for use through Arpanet and have subsequently become widely used in the industry. The protocols provide a set of services that permit users to communicate with each other across the entire Internet. The specific services that these protocols provide include file transfer, remote log-in, remote execution, remote printing, computer mail, and access to network file systems. A flow through provisioning system 51 may be used to pass the data from the Internet to the SCP 30. In this manner, a user may access an Internet website through any conventional method, for example, dial up through a modem, which can in turn communicate with the wire line telephone system 20.

Wireless Overview

Figure 2:
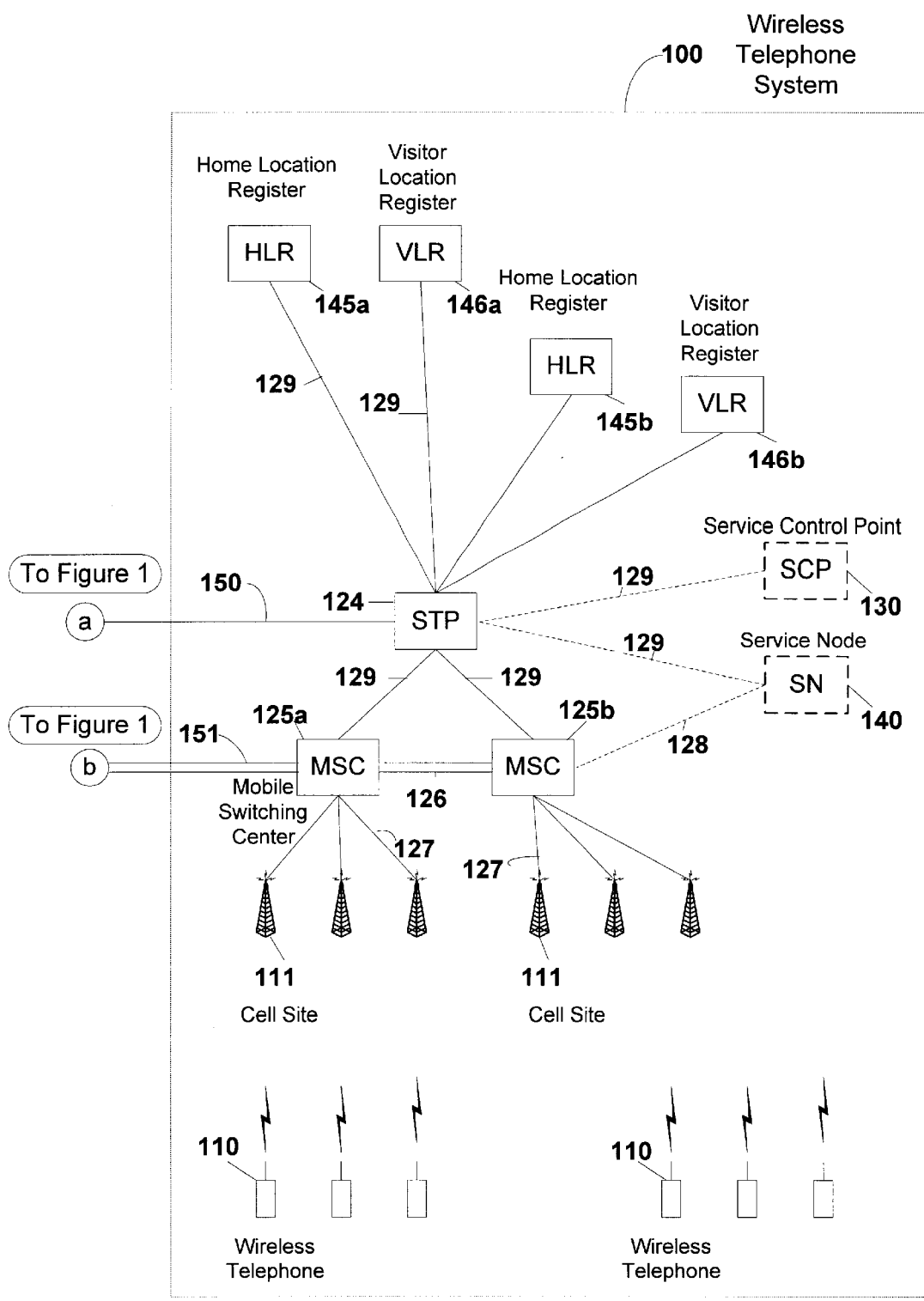
FIG. 2 is a general block diagram of an exemplary wireless telephone system for implementing intelligent network management features, in accordance with the present invention.

FIG. 2 illustrates, in a general block diagram form, a wireless telephone system 100 for implementing intelligent network management features, in accordance with the present invention. As shown in FIG. 2, a wireless telephone system 100 includes a plurality of wireless phones 110, a plurality of cell sites 111, at least one mobile switching center (MSC) shown as 125a and 125b (commonly referred to as 125), a plurality of home location registers (HLR) shown as 145a and 145b (commonly referred to as 145), and a plurality of visitor location registers (VLR) shown as 146a and 146b (commonly referred to as 146), wherein each MSC 125 has an associated HLR 145 and a VLR 146. Preferably, the wireless telephone system 100 includes a signal transfer point (STP) 124.

Wireless telephones 110 communicate with cell sites 111. Each cell site 111 covers a particular geographic region called a cell, including overlap between the cell sites. These cell sites 111 are located to maximize the geographic area that wireless telephone users have to access the wireless telephone system 100. Cell sites 111 may include sending capability and/or receiving capability. Each cell site 111 has a limited number of speech (i.e., data) channels available for communication and at least one control channel for sending and receiving messaging and routing commands. The wireless telephone 110 may request a speech channel from the cell site 111 by sending a message over a control channel. The cell site 111 may or may not grant the request depending on current speech channel occupancy.

After a wireless telephone 110 has been granted a speech channel, as that wireless telephone 110 moves from one cell site 111 to another cell site 111, the MSC 125 tracks that move and allows the wireless telephone 110 to maintain communications with the wireless telephone system 100.

MSCs 125 are interconnected by a plurality of trunk circuits 126. MSCs 125 are also connected to the wire line telephone system through at least one trunk circuit 151. MSCs 125 communicate with cell sites 111 through conventional data links 127. Preferably, base stations (not shown) are connected between the cell sites 111 and the MSCs 125.

Each wireless telephone 110 has one MSC 125 assigned as its home MSC 125. Each MSC 125 has an associated HLR 145 and a VLR 146. Each HLR 145 keeps data on each of the wireless telephones 110 assigned to that HLR 145. Included in the data residing in the HLR 145 is the on/off status of each wireless telephone 110 assigned to that HLR 145. An on-status means that the wireless telephone is in a waiting state, available to receive a call.

When a wireless telephone 110 tries to communicate with the wireless telephone system 100 through an MSC 125 that is not the user's home MSC 125, the user is still allowed access to the wireless system 100. However, in this instance, the wireless telephone 110 is considered a visiting wireless telephone 110 and is tracked and monitored by the VLR 146. The VLR 146 will report information about the visiting wireless telephone 110 to the HLR 145 assigned to that wireless telephone 110. The information includes the on/off status of the visiting wireless telephone 110.

Triggers may also be set in the wireless telephone system 110. Triggers may be set for each MSC 125 or for each wireless calling line number. The triggers in the wireless telephone system 110 operate similarly to the triggers in the wire line telephone system 20. For example, MSC 125 may request the HLR 145 for call processing instructions. The reply instructions from the HLR 145 may command the MSC 125 to take some special action as a result of a customized calling service or enhanced feature, for example, forwarding the call to a voice messaging system. In response, the MSC 125 may move through its call states, collect telephone keypad inputs, generate further messages, or route calls necessary to complete the command issued by the HLR 145.

Various triggers can by configured in the wireless telephone system 100. Triggers may be configured to affect either the calling party or the called party, or both. Triggers may be set on a per calling line number basis or on a per MSC 125 basis. One skilled in the art of wireless applications will understand the various triggers available in the wireless telephone system 100.

The wire line telephone system 20 may communicate data with the wireless telephone system 100 over a data link 150. The SCP 30 may be connected to an STP 124 in the wireless line telephone system 100. The data link 150 may be implemented with an SS7 protocol, as described above. In this manner, the SCP 30 of the wire line telephone system can communicate with any HLR 145 within the wireless telephone system 100. Alternatively, SCP 30 may be connected to each HLR 145 in the wireless telephone system 100 (not shown). Again, this data link 150 may be implemented with the SS7 protocol.

Wireless telephone system 100 may include an SCP 130 electrically connected to STP 124 over a data link 129. The SCP 130, which functions similar to SCP 30, may be used to provide enhanced features to the wireless telephone system 100. An SN 140 may be connected to the STP 124 via a data link 129, and may be connected to a MSC (e.g., MSC 125b). The SN 140, which functions similar to SN 40, may be used to provide enhanced features to the wireless telephone system 100. When intelligent devices, such as SCP 130 and/or SN 140 are added to the wireless telephone system 100, it is referred to as a wireless intelligent network (WIN).

Per Use Message Delivery

Figure 3:
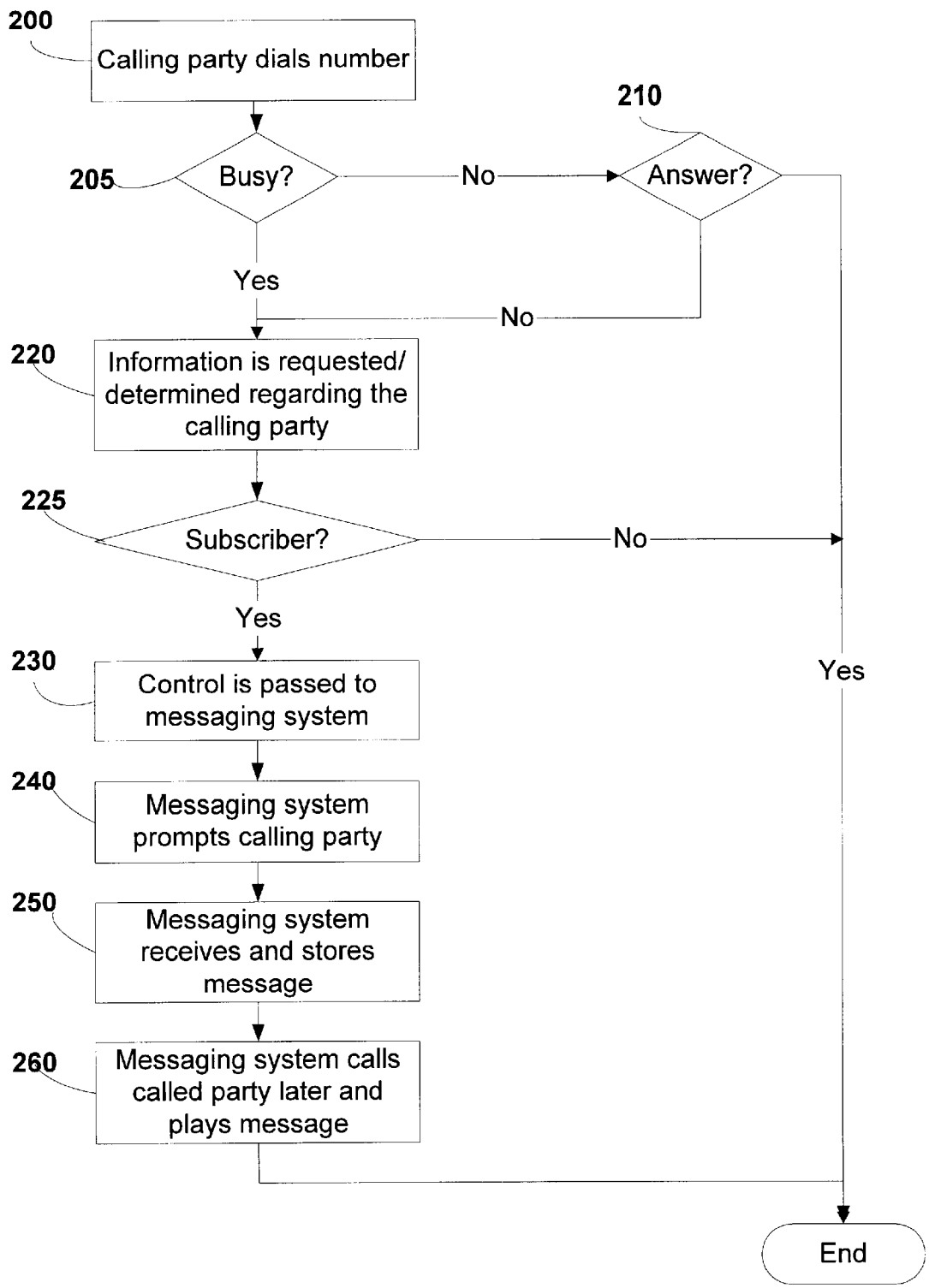
FIG. 3 is a flow diagram of an exemplary call process in accordance with the present invention.

FIG. 3 shows a flow chart of an exemplary method of leaving a message on a voice messaging system and the messaging system calling the called party to play the message at a later time in accordance with the present invention. In a preferred embodiment described herein, the present invention is implemented on an AIN wire line telephone system 20 and the original call has been made on a wire line telephone 10, though it is understood that the originating call can be made from any telephone to any telephone, in any type of intelligent telephone system.

As shown in FIG. 3, at step 200, a calling party takes his wire line telephone 10 off-hook and dials the called number, also referred to herein as the originally dialed number. An intelligent device, such as the SSP 25a of FIG. 1, in the telephone system 20 receives the called number.

At step 205, if the called number has a busy status, the exemplary system is triggered to request/determine information regarding the calling party, at step 220. Particularly, at step 220, the system queries a device in the AIN to determine whether the calling party is a subscriber. Using the information obtained at step 220, as shown by step 225, if the calling party is a subscriber, processing continues to step 230. Otherwise, if the calling party is not a subscriber, the call is terminated in a conventional manner, such as for example, providing a busy signal to the calling party or forwarding the call to a voice messaging system, as shown by step 225.

At step 205, if the called number does not have a busy status, the exemplary system then determines if there is an answer status on the called line, shown at step 210. At step 210 if there is an answer status on the called line, the call is processed as a conventional call and the system ends its processing of the call. At step 210, if there is a no-answer status on the called line, the system is triggered to request/determine information regarding the calling party, at step 220. Particularly, at step 220, the system determines whether the calling party is a subscriber.

At step 220, information is requested/determined regarding the calling party. Particularly, the system queries a device in the wire line telephone system to determine whether the calling party is a subscriber. For example, an AIN trigger fires, which prompts an AIN device to request information from the AIN network. In this preferred embodiment, the AIN trigger fires on the local SSP 25 or on the calling line number. The SSP 25 then sends a query to the SCP 30 requesting whether the calling party is a subscriber. In this preferred embodiment, the SCP 30 receives the query from the SSP 25 and a SPA 45 determines whether the calling party is a subscriber. The SPA 45 may determine that the calling party is a subscriber by analyzing information contained in the query message or by analyzing information contained in its database 31. Preferably, this is determined by comparing the calling party's telephone number to a list or group of telephone numbers (a subscription list) of users that subscribe to the present invention. A telephone user that subscribes to the present invention is pre-authorized to use the present invention. If the calling party's telephone number is in the subscription list, then the party is a subscriber. Preferably the subscription list resides in the database 31.

At step 225, the system determines how to process the call depending on whether the calling party is a subscriber. Whether the calling party is a subscriber was determined at step 220. If the calling party is a subscriber, the call is processed according to the present invention and proceeds to step 230, described below. If the calling party is not a subscriber, the call is processed as a conventional call, such as for example, providing a busy signal to the calling party or forwarding the call to a voice messaging system. In the exemplary wire line telephone system 10, if the calling party is not a subscriber, the SCP 30 will command the SSP 25 to process the call as dialed.

At step 230, control is passed to a voice messaging system. In this embodiment, SCP 30 sends a message to the SSP commanding it to send the call to the SN to begin processing the call. SN 40 connects to the calling line through local SSP 25a. Since SN 40 may not be connected to every SSP 25 in a wire line telephone system, SN 40 may connect to the SSP 25 of the calling line via other SSPs 25.

At step 240, the voice messaging system prompts the calling party for a message. Preferably, the prompt is audible voice notification. Alternatively, the prompt may be through audible tones, and/or through other indicators such as a lamp. The subscriber may choose to either leave a message or to end the call processing (not shown). The subscriber may select the option to leave a message through either telephone keypad 11 entry or through voice recognition and processing techniques, for example. Preferably, the system receives the response through either telephone keypad 11 entry or through voice recognition and processing techniques, for example. Preferably, the SN 40 receives the selection to leave a message. If the subscriber selects not leaving a message, the call processing ends (not shown).

At step 250, the subscriber provides a message into their wire line telephone 10 and the messaging system receives and stores the message. In the preferred embodiment, SN 40 receives the message and records the message into a data storage device. Preferably, the data storage device is included in SN 40. Preferably, at the end of the message the SN 40 prompts ("message prompts") the subscriber for message options. Message options may include reviewing the message, deleting the message, re-recording the message, and/or sending the message.

If the subscriber selects to leave a message, the system may provide additional prompts ("delivery prompts") regarding delivery options of the message. Delivery options may include a frequency of how often to dial the called party, a priority level to determine how often to dial the called party, a maximum time or number of tries to dial the called party, a specific time to dial the called party, for a time to begin dialing the called party, or a different telephone number to call the called party. If the system prompts the user for a priority level (e.g., high priority, low priority), the system determines how often to dial the called party. Preferably, the SN 40 provides prompts and receives options into the SN 40 through telephone keypad 11 or through voice recognition and processing techniques, for example. Processing continues at step 260.

At step 260, the messaging system dials the called party at intervals until receiving an answer status on the called number and then plays the message. Preferably, the SN 40 dials the called number at a regular fixed interval until receiving an answer status on the called number, or until the maximum number of tries has been reached, for example. More preferably, SN 40 dials the called number at intervals according to the delivery options described above.

Figure 4:
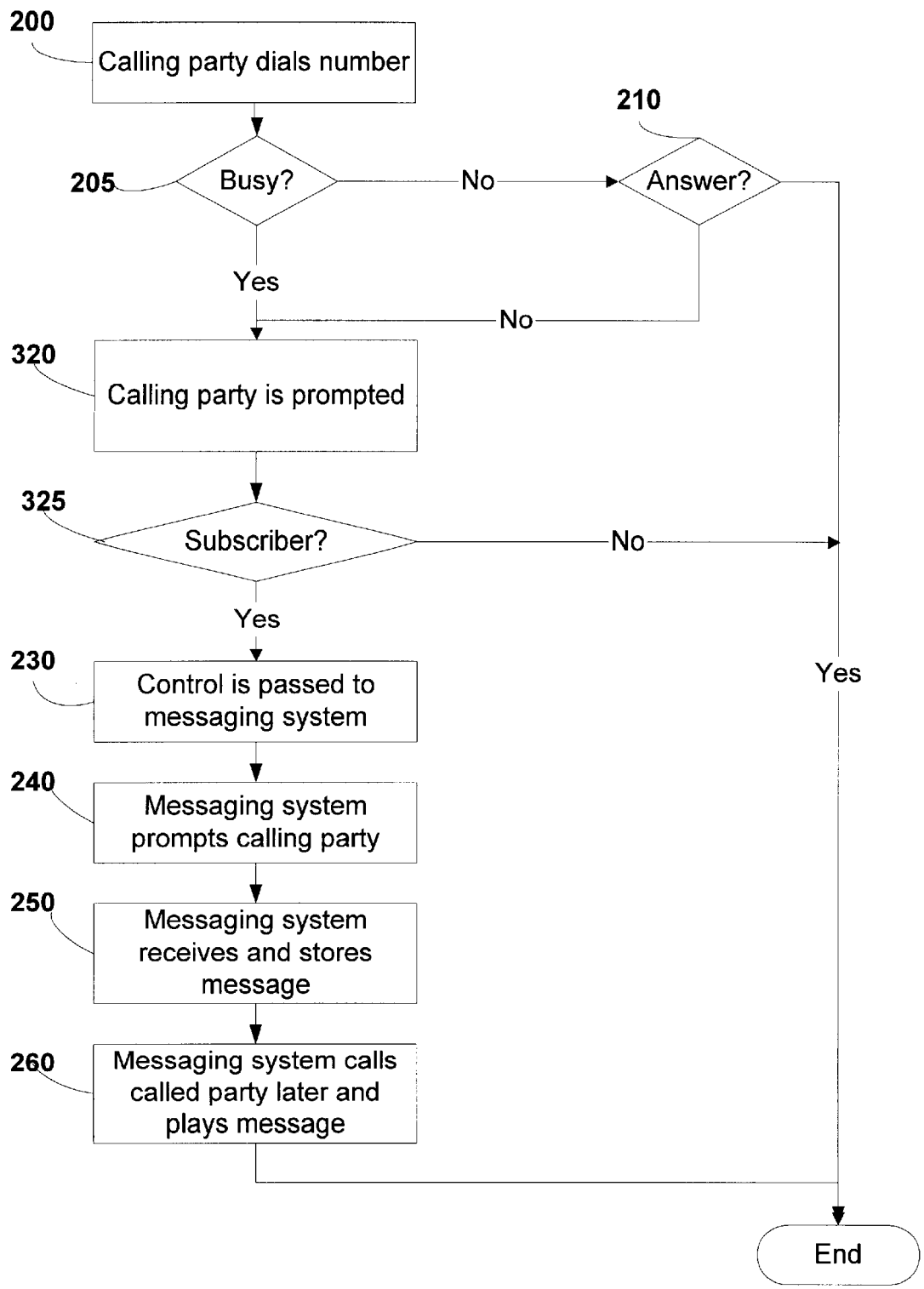
FIG. 4 is a flow diagram of another exemplary call process in accordance with the present invention.

FIG. 4 shows a flow chart of another exemplary method of leaving a message on a voice messaging system and the messaging system calling the called party to play the message at a later time in accordance with the present invention. FIG. 4 contains elements similar to those described above with respect to FIG. 3, and their descriptions are omitted for brevity.

At step 320, the calling party is prompted to enter a predetermined input. By inputting the predetermined input, the calling party may select to leave a message and the system may process the call according to the present invention regardless of whether or not the calling party was a subscriber before inputting the predetermined input. A calling party that selects to leave a message in this manner will also be referred to as a subscriber, although he/she is a subscriber on a per use basis. For example, a calling party could be prompted to enter a predetermined input (e.g., a keypad entry such as keypad numeral "1") that would allow the calling party to leave a message in the voice messaging system to be delivered later to the called party. Thus, the calling party would effectively become a subscriber for the duration of that telephone call, and thus be authorized to use the present invention. At step 325, if the calling party has selected to leave a message become a subscriber on a per use basis, processing proceeds to step 230. At step 325, if the calling party has not selected to leave a message, the call is processed as a conventional call, and the system ends its processing of the call. Preferably, the SN 40 prompts the calling party. Preferably, the SN 40 provides prompts and receives options into the SN 40 through telephone keypad 11 or through voice recognition and processing techniques, for example.

In an alternate embodiment, the calling line is a wireless telephone 110. Preferably, in this embodiment the wireless telephone system 100 is a wireless intelligent network (WIN). The proper triggers are configured in the wireless telephone system 100 so that the embodiment operates similar to the above described embodiments originating in the wire line telephone system 20. The SCP 130 and the SN 140 in the wireless telephone system 100 are adapted analogously to the SCP 30 and the SN 40 in the wire line telephone system 20.

Therefore, in accordance with the present invention, a calling party can leave a message for a called party, even if the called party does not have an answering machine or does not subscribe to a voice messaging service.

It should be noted that the implementation of the present invention is not limited to AIN-based networks and other advanced or intelligent networks and arrangements may be used to implement the invention.

The invention may be embodied in the form of appropriate computer software or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system for receiving a message from a telephone subscriber location and providing the message to a called party located at a called number, comprising:

a wire line telephone system comprising a service control point and a service switching point in communication with each other, the wire line telephone system adapted to dial the called number, receive the message from the telephone subscriber location when the called number has one of a busy status and a no-answer status, store the message in at least one of the service control point and the service switching point, and dial the called number at periodic intervals until the called number has an answer status, and thereafter deliver the message to the called party via the called number.

2. The system of claim 1 wherein said wire line telephone system further comprises:

a messaging system that receives the message from the telephone subscriber location and stores the message; and a first signal transfer point adapted to communicate with said service switching point; and wherein the service switching point is adapted to communicate with the telephone subscriber location and the service control point is adapted to communicate with said first signal transfer point.

3. The system of claim 2 wherein said wire line telephone system further comprises a data link connected to said first signal transfer point and adapted to communicate with a wireless telephone system.

4. The system of claim 1 wherein said service control point is adapted to determine whether the telephone subscriber location is permitted to leave the message prior to receiving and storing the message.

5. The system of claim 1 wherein said service control point is adapted to receive a predetermined input from the telephone subscriber location indicating the message is forthcoming.

6. The system of claim 1 wherein said wire line telephone system further comprises a service node connected to the service switching point and connected to the service control point.

7. The system of claim 1 wherein said service switching point comprises the messaging system.

8. The system of claim 1 wherein said service switching point is adapted to receive at least one of a plurality of message options and a plurality of delivery options from the telephone subscriber location.

9. The system of claim 1 wherein said service control point comprises the messaging system.

10. The system of claim 1 wherein said service control point is adapted to receive at least one of a plurality of delivery options and a plurality of message options from the telephone subscriber location.

11. A system for receiving a message from a telephone subscriber location and providing the message to a called party located at a called number, comprising:

a wireless telephone system comprising a service control point and a mobile switching center in communication with each other, the wireless telephone system adapted to dial the called number, receive the message from the telephone subscriber location when the called number has one of a busy status and a no-answer status, store the message in at least one of the service control point and the mobile switching center, and dial the called number at periodic intervals until the called number has an answer status, and thereafter deliver the message to the called party via the called number.

12. The system of claim 11 wherein said wireless telephone system further comprises:

a home location register adapted to communicate with the mobile switching center;

a signal transfer point adapted to communicate with said mobile switching center and said home location register; and wherein the mobile switching center is connected to communicate with a plurality of cell sites and the service control point is adapted to communicate with said signal transfer point.

13. The system of claim 12 wherein said wireless telephone system further comprises a data link connected to said signal transfer point and adapted to communicate with a wire line telephone system.

14. A method for delivering a message from a telephone subscriber location to a called party, the method comprising:

receiving the called telephone number from the telephone subscriber location, the called telephone number associated with the called party;

receiving the message at a messaging system, the message being sent from a telephone subscriber location after determining that said called telephone number has one of either a busy status and a no-answer status;

receiving a second telephone number that is different from the called telephone number;

storing the message;

subsequently dialing said second telephone number at periodic intervals until the second telephone number has an answer status; and thereafter delivering said message to said second telephone number.

15. The method of claim 14 further comprising determining whether said telephone subscriber location is authorized to send the message to the messaging system.

16. The method of claim 14 further comprising prompting the telephone subscriber location for the message after determining that said called number has one of either a busy status and a no-answer status.

17. The method of claim 16 wherein said prompting for said message comprises prompting with audible voice notification.

18. The method of claim 14 further comprising prompting the telephone subscriber location for at least one delivery option after receiving the message from the telephone subscriber location, and thereafter receiving selected at least one delivery option from the telephone subscriber location.

19. The method of claim 14 further comprising prompting the telephone subscriber location for at least one message option after receiving the message from the telephone subscriber location, and thereafter receiving the selected at least one message option from the telephone subscriber location.

20. The method of claim 19 wherein said prompting for message options comprises prompting with audible voice notification.

* * * * *

UNITED STATES PATENT AND TRADEMARK OFFICE
CERTIFICATE OF CORRECTION

PATENT NO. : 6,711,240 B2
DATED : March 23, 2004
INVENTOR(S) : Sunil Contractor

It is certified that error appears in the above-identified patent and that said Letters Patent is hereby corrected as shown below:

Column 11,
Line 44, delete "at least one of".
Line 45, delete "and the mobile switching center".

Signed and Sealed this

Twenty-fourth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,711,240 B2 Page 1 of 1
APPLICATION NO. : 09/727660
DATED : March 23, 2004
INVENTOR(S) : Sunil Contractor It is certified that error appears in the above-identified patent and that said Letters Patent is hereby corrected as shown below:

Column 10,
Line 58, delete "at least one of".
Line 59, delete "and the service switching point".

Signed and Sealed this

Fourth Day of July, 2006

JON W. DUDAS
*Director of the United States Patent and Trademark Office*